Figure 1:
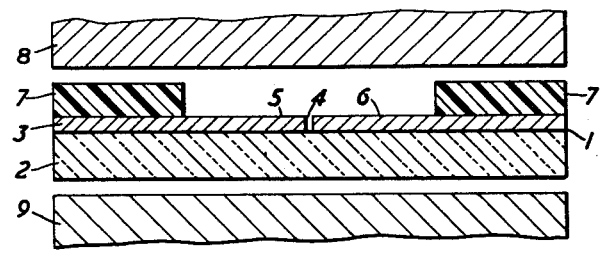

June 30, 1964

A. LORO ET AL 3,138,850

METHOD OF MAKING A TRANSDUCER ELEMENT

Filed Nov. 26, 1957

INVENTORS
George Victor Planer
Alberto Loro
BY
Pierce, Scheffler & Parker.
ATTORNEY

United States Patent Office

3,138,850
Patented June 30, 1964

3,138,850
METHOD OF MAKING A TRANSDUCER ELEMENT
Alberto Loro, Montreal, Quebec, Canada, and George Victor Planer, Sunbury-on-Thames, England, assignors to Cosmocord Limited, Waltham Cross, England, a British company
Filed Nov. 26, 1957, Ser. No. 698,960
Claims priority, application Great Britain Dec. 4, 1956
1 Claim. (Cl. 29—155.5)

This invention relates to transucers using a material which exhibits the magneto-resistive phenomenon. The invention can be applied to a variety of transducers including, for example, gramophone pickups and microphones.

Accordingly the invention provides a transducer utilizing a material which exhibits the magneto-resistive phenomenon which comprises a film of the material carried upon a carrier member, the film having thereon two areas of conductive material closely approaching each other at one part, a support member supporting the carrier member whereby the film at the one part is movable relative to a magnetic field and means for moving the carrier member thereby to produce an output signal from the transducer in accordance with said movement by virtue of the magneto-resistive phenomenon.

The film also provides a transducer which comprises a film of indium antimonide carried upon a carrier member, the film having thereon two areas of conductive material closely approaching each other at one part, a support member supporting the carrier member relative to a magnetic member whereby the film at the one part is movable relative to a magnetic field produced by the magnetic member and a mechanical coupling between a mechanically movable member and the support member thereby to produce an output signal from the transducer in accordance with said movement by virtue of the magneto-resistive phenomenon.

More particularly, the invention provides a transducer which comprises a film of indium antimonide intimately bonded to a carrier member, the film having thereon two areas of conductive material closely approaching each other along two approximately parallel edges at one part, a support member supporting the carrier member relative to a magnetic member whereby the film at the one part is movable relative to a magnetic field produced by the magnetic member and a diaphragm mechanically coupled to said members thereby to cause relative movement between the film and the magnetic field so to produce an output signal from the transducer in accordance with the movement of the diaphragm by virtue of the magneto-resistive phenomenon.

From another aspect, the invention also more particularly provides a transducer which comprises a film of indium antimonide intimately bonded to a carrier member, the film having thereon two areas of conductive material closely approaching each other along two approximately parallel edges at one part, a support member supporting the carrier member relative to a magnetic member whereby the film at the one part is movable relative to a magnetic field produced by the magnetic member and a stylus mechanically coupled to said members thereby to cause relative movement between the film and the magnetic field so to produce an output signal from the transducer in accordance with the movement of the stylus by virtue of the magneto-resistive phenomenon.

Figure 2:
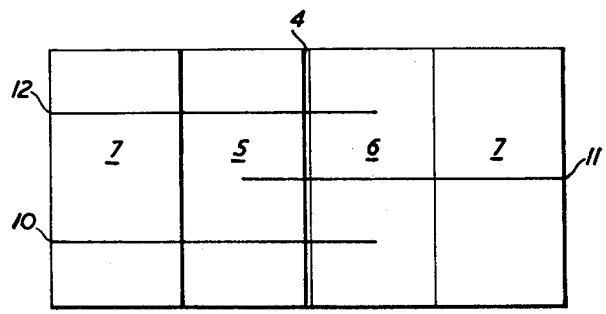

In order that the invention may be more readily understood one particular embodiment thereof will now be described, by way of example only, with reference to the accompanying drawings in which:

FIGURE 1 is a diagrammatic sectional view of a transducer in accordance with the present invention, and FIGURE 2 is a plan view of part of the transducer shown in FIGURE 1.

In FIGURE 1 there is shown a transducer employing as the effective material indium antimonide. A film of this material 1 is secured to thin glass plate 2 forming a carrier member. A layer of conductive material, 3, thin and more conductive than the antimonide, for example silver, is laid over the antimonide layer 1, but leaving a narrow gap 4 extending at one point across the width of the layer. This, in effect, produces two silver electrodes 5, 6 between which extends a narrow film of the antimonide. A robust conductive material 7, for example silver paint, is applied to the silver electrodes, for the attachment of terminal leads, or the like.

In using such a transducer element in a microphone or gramophone pickup, the glass support 2 is attached to a suitable diaphragm or stylus so that it is moved in its own plane. A magnetic system comprising members 8 and 9, preferably permanently magnetic, is provided for producing a magnetic field in a direction at right angles to the plane of the antimonide layer. A current is passed through the layer. If the layer is caused by movement of the diaphragm to move into and out of region of different magnetic field strength the resistance of the layer will change, and the current will accordingly be modulated in accordance with the excursions of the diaphragm.

In the manufacture of a transducer of the type described a number of serious difficulties are encountered. In the first place, it is desirable to produce an extremely thin film of the effective material in order that it shall have a conveniently high resistance. Again, in the case of indium antimonide, which is a preferred material because it exhibits the magneto-resistive effects to a high degree, the conductivity of the material is high. In practice, it is inconvenient to have a transducer presenting a very low resistance, requiring for its operation a comparatively low voltage and high current.

In the preferred method of producing the thin layer of antimonide, a slip of the material is cut, for example, by a slitting saw, from a block; the slip is initially as thin as is practicable. The slip is held on a work holder, and one face is then worked until it is plane. The slip is then turned over, and the worked face is then applied and secured to the glass plate forming the support. The other face of the material is then worked in the same way. By this process it has been found possible to produce a layer of the order of a few microns in thickness.

Other methods of producing very thin layers, for example, vacuum deposition cathode sputtering moulding, spraying, spreading, solvent evaporation and like techniques, are not precluded. Thus a very shallow depression can be produced in a glass support by etching; the antimonide is introduced into the depression by casting under pressure, a cover plate being used over the depression, and subsequently working the exposed surface.

A second requirement is that for the maximum magneto-resistive effect, the layer of antimonide should have a relatively short dimension in the direction of current flow and a substantially larger dimension in the direction which is at right angles both to the current flow and the magnetic field. It is also desirable that the dimension in the direction of current flow should be small, when the element is to be subjected to a small displacement relative to the magnetic field.

This requirement is met by applying the silver or like overlay with a narrow gap in the overlay, as described above. Again, various methods are possible. At the present time the most convenient method is to apply the silver by vacuum deposition, using a fine wire as a mask to prevent deposition where the gap is required. This method is simple and effective and gives a well defined gap of closely controllable dimensions. However, good results can also be obtained by first coating the whole surface of the layer with silver by vacuum deposition applying a photosensitive resist to the silver layer, exposing the resist layer to an appropriate image, and then, by means of an etchant for silver but not the antimonide, removing the silver in the gap position. In another method of forming a narrow gap, an antimonide layer is first produced and then a thin line of bituminous paint is applied to the layer where the gap is to be formed. The surface is coated with copper by electroplating; the paint inhibits the deposition of copper, on the antimonide beneath it, so that an unplated gap is presented when the paint is removed.

It has been found possible to produce by such means accurate gaps of the order of .3 mm. in length (i.e. in the current direction) and a few mms. width.

In a modification of the transducer described, the resistance is increased by splitting the antimonide in the gap into a series of discrete paths and effectively connected the paths in series. This can be effected extremely simply by removing the antimonide layer by a series of slits as at 10, 11 and 12 in FIGURE 2, the slits extending in turn from alternate ends of the transducer element, parallel to the direction of current flow in the gap, and each traversing the gap. In this way the two electrodes are cut by the slits into a series of electrodes joined in pairs by antimonide in the gap. A single slit used in this way produces a substantial increase of resistance, approaching a four times increase, since the gap resistance is doubled and the two gaps are in series. A gap of the dimensions and with a layer thickness as mentioned above has been produced, to give a resistance of the order of 10 to 100 ohms with a magnetic field change from 0 to 10,000 gauss; these figures are increased by slitting the gap as described.

The slits in the antimonide can be produced mechanically, for example by means of a scribing, slitting or abrasive tool which removes the antimonide layer and the silver layer and silver paint layer above it, or chemically by the use of a photo-resist method similar to that described above, but using an etchant for both the antimonide and silver layers; when using the plating method described above, the plating can be prevented at the places where the slits are to be formed, by applying the paint in the same way. It is preferred, for reason of strength, not to cut the base support.

It will also be understood that while a single antimonide layer has been described, more complicated systems, using a plurality of such layers, are feasible.

The magnetic system for producing the magnetic field in which the transducer element moves can consist of a simple permanent magnet with appropriate pole piece of high permeability material defining an air gap. However, as the efficacy of the transducer is related to the change of field strength to which the material is subjected, it is desirable that the magnetic system should produce a field pattern which produces as rapid a change of field strength in as small a distance as possible. Hence it is advantageous in some cases to use a plurality of pole pieces on the magnet or magnets to modify the field pattern. The field through which the material moves should be as high as can be arranged, since the greater the field strength the higher the resistance of the material.

In the transducer described the current carrying element is moved with respect to the magnetic field, but this is not the only way and other arrangements can be adopted. Thus, it is also possible to move the field producing member with respect to the current carrying element, or otherwise to vary the field strength. The field strength can be varied by varying an electromagnetic current, but such an arrangement is of limited application. Since the magneto-resistive effect is a function of magnetic field, the transducer can be used generally in indication measuring or control apparatus to respond to field variations. The transducer can thus be used for magnetic and like measurements.

We claim:

A method of manufacturing a transducer element, which comprises the steps of producing on one face of a support member of an insulating material a thin film of a material which exhibits the magneto-resistive effect, working said film so that its thickness is of the order of a few microns, disposing a fine wire on that face of said film which is not contiguous with said support member to mask a narrow elongated strip of said film, applying a layer of a highly conductive material such as silver by vacuum deposition upon said film and said wire, and thereafter removing said masking wire to provide at least two electrode areas of the electrically-conductive material contiguous with said last-named face of the magneto-resistive film, said areas being close to each other along two substantially parallel edges which define a narrow non-conductive separation gap therebetween resulting from use of the masking wire.

References Cited in the file of this patent

UNITED STATES PATENTS

| | | |
|---|---|---|
| 1,794,376 | Hartsough | Mar. 5, 1941 |
| 2,414,793 | Becker | Jan. 28, 1947 |
| 2,423,476 | Billings | July 8, 1947 |
| 2,597,674 | Robbins | May 20, 1952 |
| 2,649,569 | Pearson | Aug. 18, 1953 |
| 2,707,319 | Conrad | May 3, 1955 |
| 2,736,858 | Welker | Feb. 28, 1956 |
| 2,744,308 | Loman | May 8, 1956 |
| 2,752,434 | Dunlap | June 26, 1956 |
| 2,793,275 | Breckenridge et al. | May 21, 1957 |
| 2,828,396 | Forman et al. | Mar. 25, 1958 |
| 2,849,583 | Pritikin | Aug. 26, 1958 |
| 2,866,857 | Andrews | Dec. 30, 1958 |
| 2,894,234 | Weiss | July 7, 1959 |
| 2,924,633 | Sichling | Feb. 9, 1960 |